(12) United States Patent
Fukui et al.

(10) Patent No.: US 9,982,864 B2
(45) Date of Patent: May 29, 2018

(54) ILLUMINATION APPARATUS AND AUTOMOBILE EQUIPPED WITH SAME

(71) Applicant: Panasonic Intellectual Property Management Co., Ltd., Osaka (JP)

(72) Inventors: Atsushi Fukui, Osaka (JP); Shohroh Mochida, Osaka (JP); Takayuki Yamaguchi, Osaka (JP); Tomoyuki Ogata, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 9 days.

(21) Appl. No.: 15/109,451

(22) PCT Filed: Feb. 24, 2015

(86) PCT No.: PCT/JP2015/000903
§ 371 (c)(1),
(2) Date: Jul. 1, 2016

(87) PCT Pub. No.: WO2015/129251
PCT Pub. Date: Sep. 3, 2015

(65) Prior Publication Data
US 2016/0334074 A1 Nov. 17, 2016

(30) Foreign Application Priority Data

Feb. 27, 2014 (JP) .................................. 2014-036328

(51) Int. Cl.
*B60Q 1/00* (2006.01)
*F21S 8/10* (2006.01)
*G02B 19/00* (2006.01)

(52) U.S. Cl.
CPC ............. *F21S 48/24* (2013.01); *F21S 41/265* (2018.01); *F21S 41/275* (2018.01);
(Continued)

(58) Field of Classification Search
CPC .... F21S 48/215; F21S 48/2212; F21S 48/236; F21S 48/1275; F21S 48/1283; F21S 48/1329; F21S 48/24; G02B 19/0061
See application file for complete search history.

(56) References Cited

U.S. PATENT DOCUMENTS

2007/0070616 A1* 3/2007 Segawa ................... G09F 13/04
362/97.1
2010/0032697 A1* 2/2010 Nagai ................... H01L 33/641
257/98

(Continued)

FOREIGN PATENT DOCUMENTS

JP 2010-067417 3/2010
JP 2010-080306 4/2010

(Continued)

OTHER PUBLICATIONS

International Search Report of PCT application No. PCT/JP2015/000903 dated Jun. 2, 2015.

*Primary Examiner* — Elmito Breval
*Assistant Examiner* — Omar Rojas Cadima
(74) *Attorney, Agent, or Firm* — Panasonic IP Management; Kerry S. Culpepper

(57) ABSTRACT

An illumination apparatus including: multiple LEDs; and a lens unit that is placed correspondingly to the respective LEDs, wherein the lens unit includes a transmission lens, a first total-reflection lens, and a second total-reflection lens, wherein an incidence surface and an emission surface of the transmission lens, as well as incidence surfaces, emission surfaces and total-reflection surfaces of the first total-reflection lens and the second total-reflection lens are two-axis anamorphic aspherical surfaces, a microlens array is formed on at least one of the incidence surface and the emission surface of the transmission lens, a microlens array is formed on at least one of the emission surfaces, the total-reflection (Continued)

surfaces and the incidence surfaces of the first total-reflection lens and the second total-reflection lens, and the microlens arrays each have a structure in which microlenses are periodically arrayed, and are arrayed along the vertical and horizontal directions of the illumination apparatus.

11 Claims, 10 Drawing Sheets

(52) U.S. Cl.
CPC ............. *F21S 41/322* (2018.01); *F21S 43/14* (2018.01); *F21S 43/26* (2018.01); *F21S 43/315* (2018.01); *F21S 43/40* (2018.01); *G02B 19/0061* (2013.01)

(56) References Cited

U.S. PATENT DOCUMENTS

| | | | |
|---|---|---|---|
| 2011/0026247 A1* | 2/2011 | Zhang | F21V 5/04 362/235 |
| 2012/0243220 A1* | 9/2012 | Yamamoto | H01L 33/54 362/231 |

FOREIGN PATENT DOCUMENTS

| | | |
|---|---|---|
| JP | 2012-145904 | 8/2012 |
| JP | 2012-169170 | 9/2012 |
| JP | 2013-073687 | 4/2013 |

* cited by examiner

[FIG. 1A]
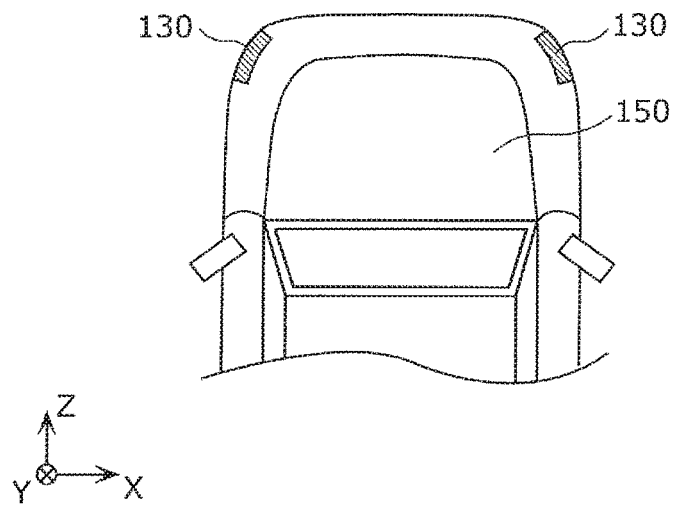
[FIG. 1B]
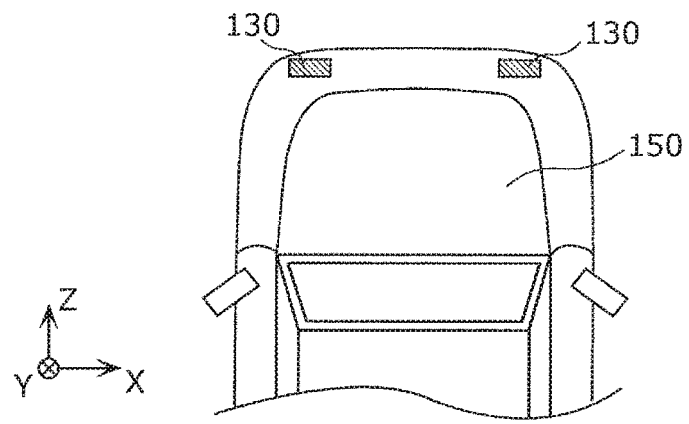

[FIG. 2]
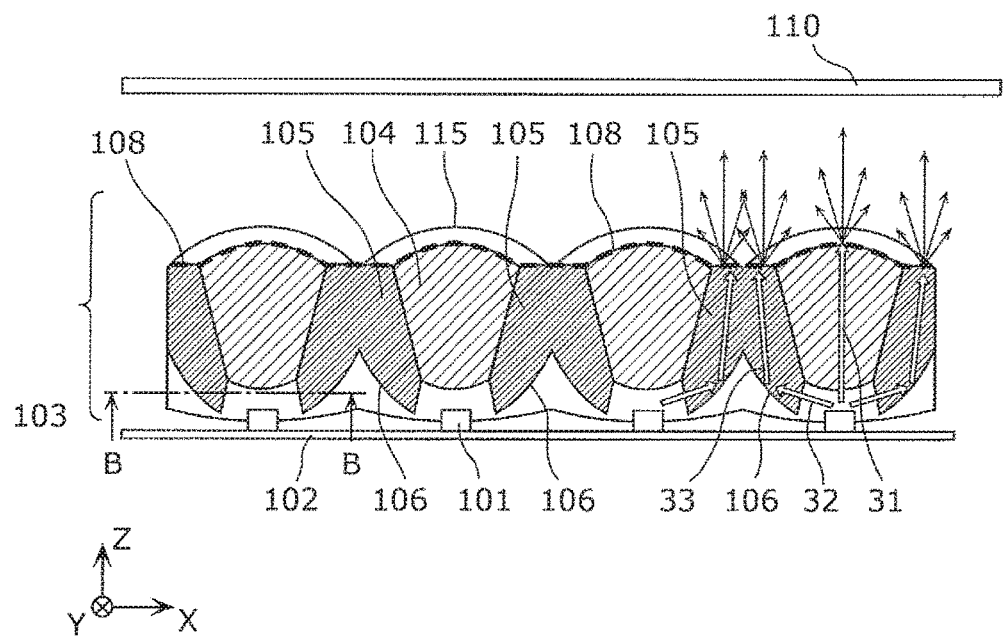
[FIG. 3]
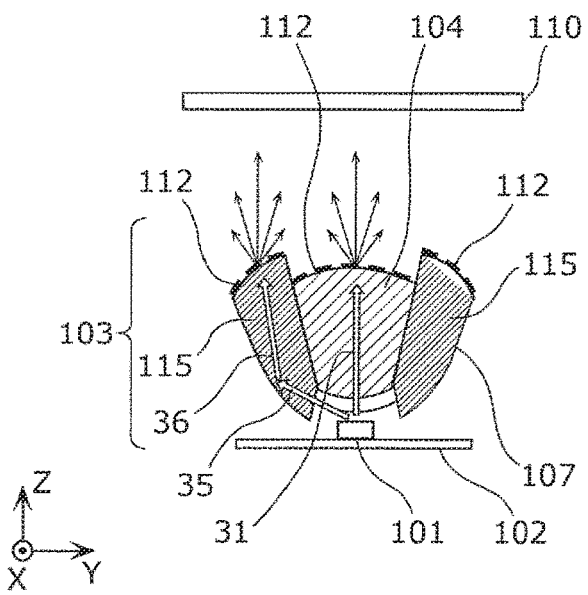

[FIG. 4A]
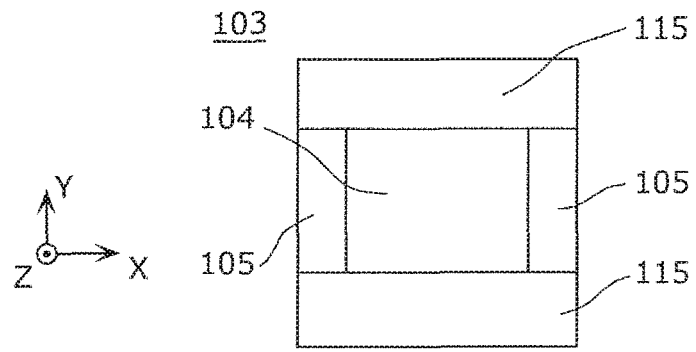
[FIG. 4B]
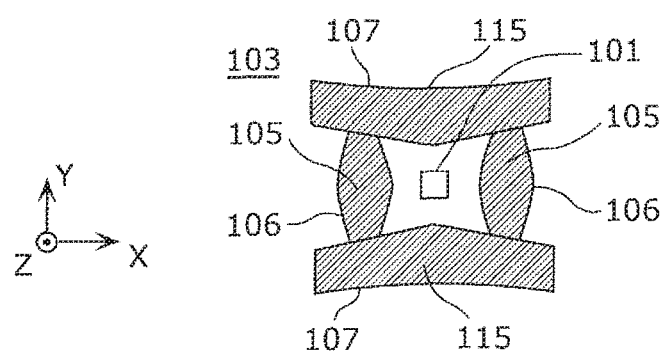
[FIG. 5A]
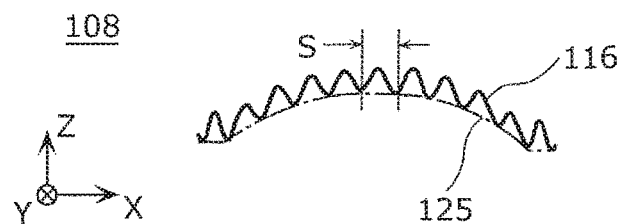
[FIG. 5B]
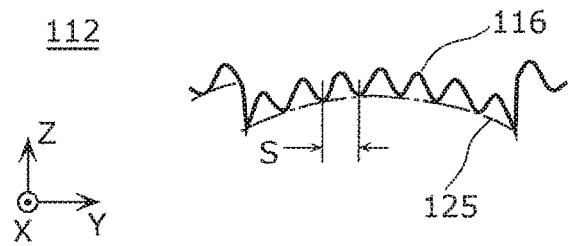

[FIG. 6]
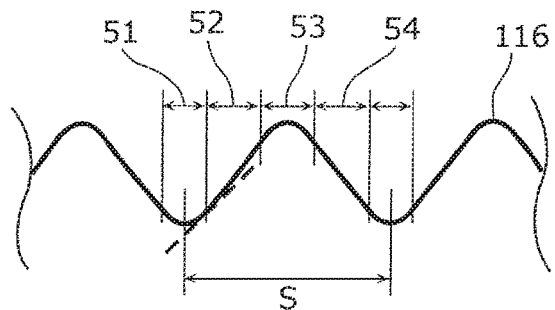
[FIG. 7A]
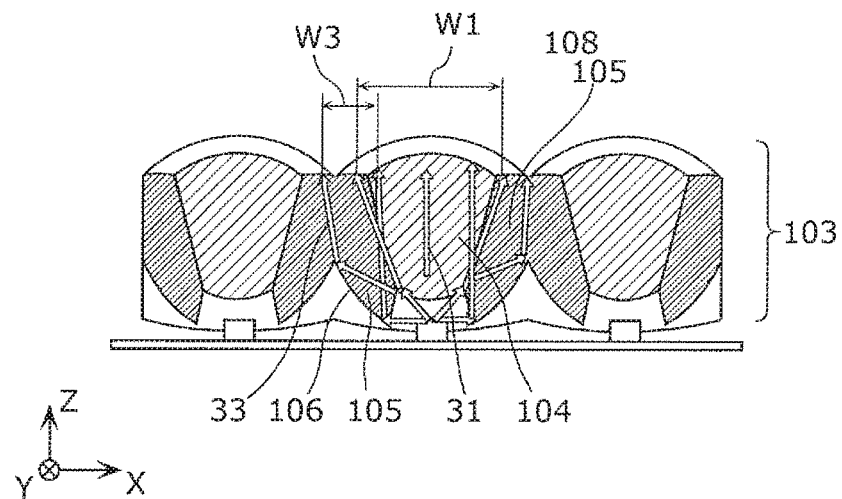
[FIG. 7B]
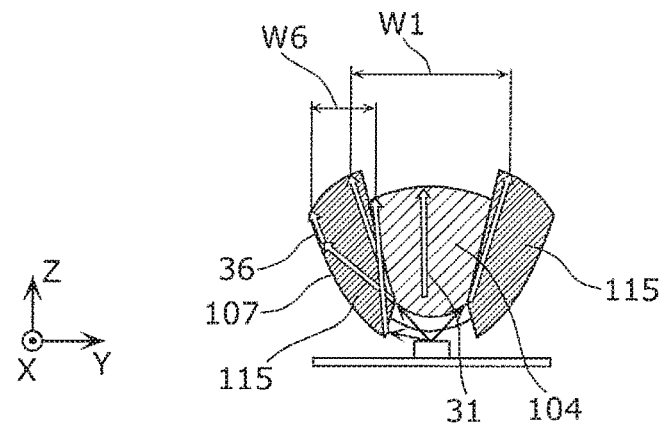

[FIG. 8]
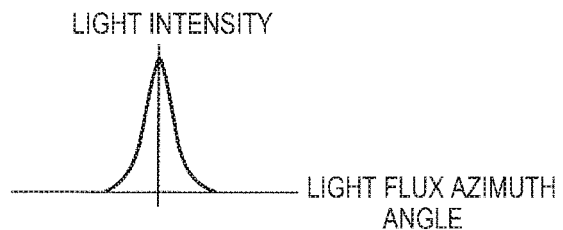
[FIG. 9]
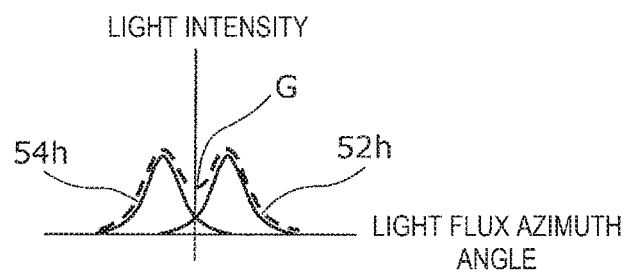
[FIG. 10]
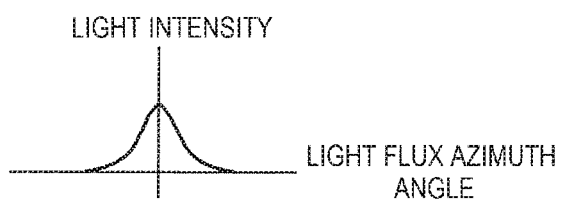
[FIG. 11]
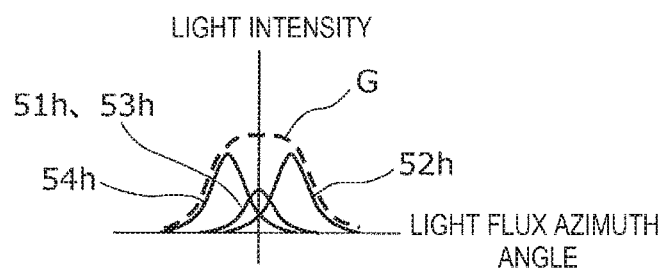

[FIG. 12]
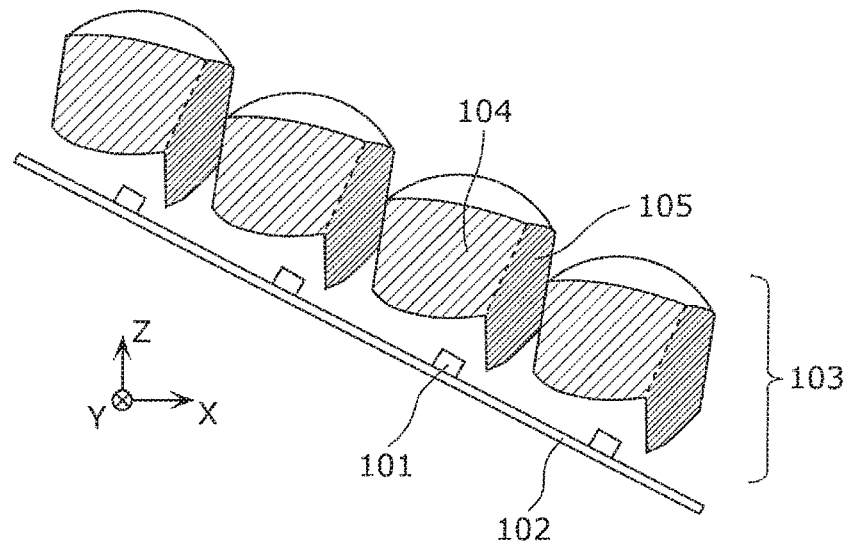
[FIG. 13]
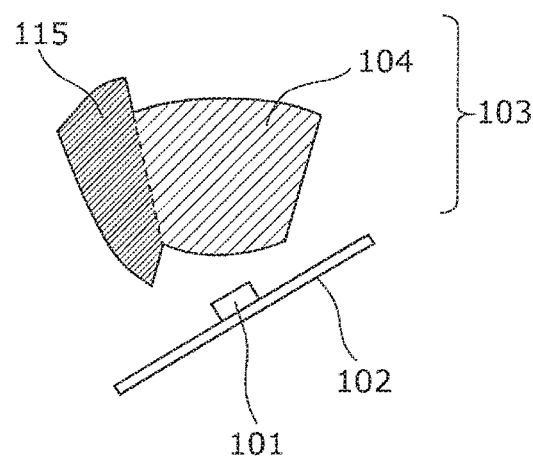
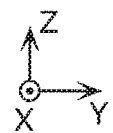

[FIG. 14A]
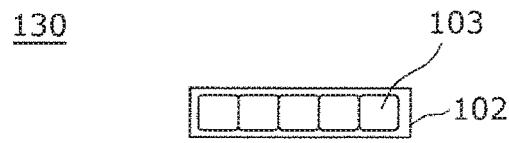
[FIG. 14B]
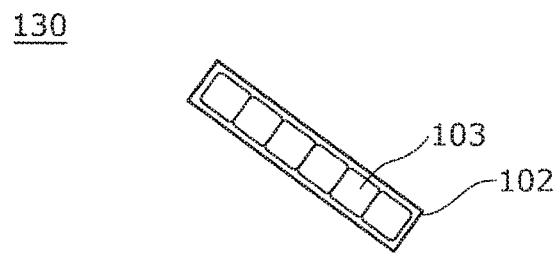
[FIG. 14C]
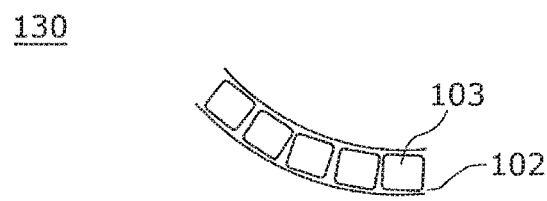
[FIG. 14D]
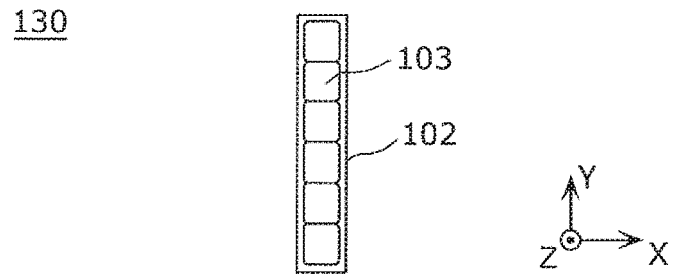

[FIG. 15]
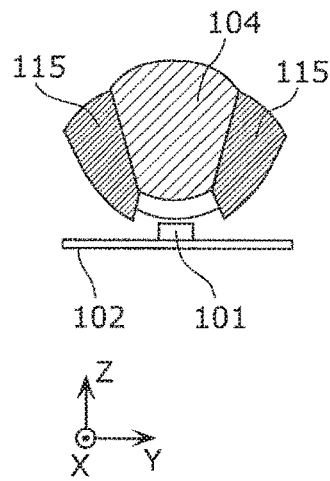
[FIG. 16]
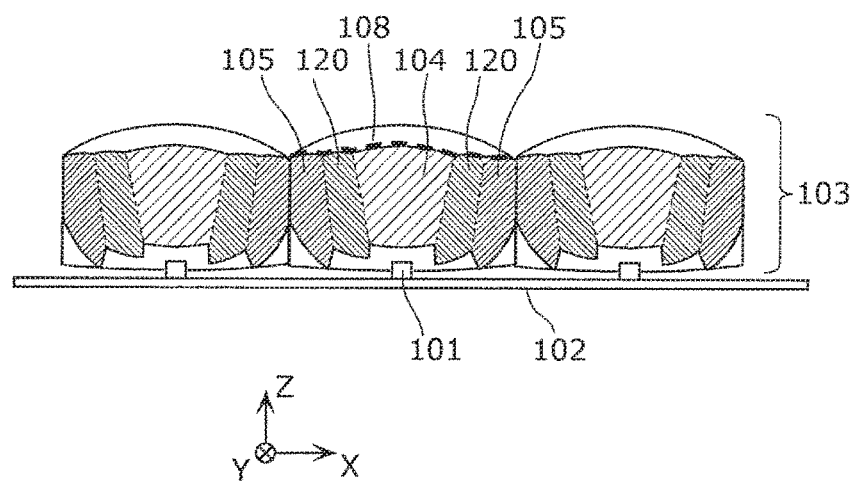
[FIG. 17]
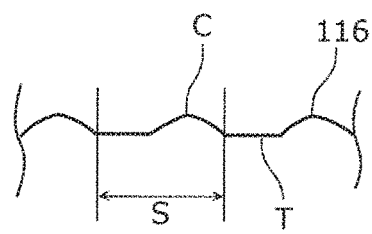

[FIG. 18A]
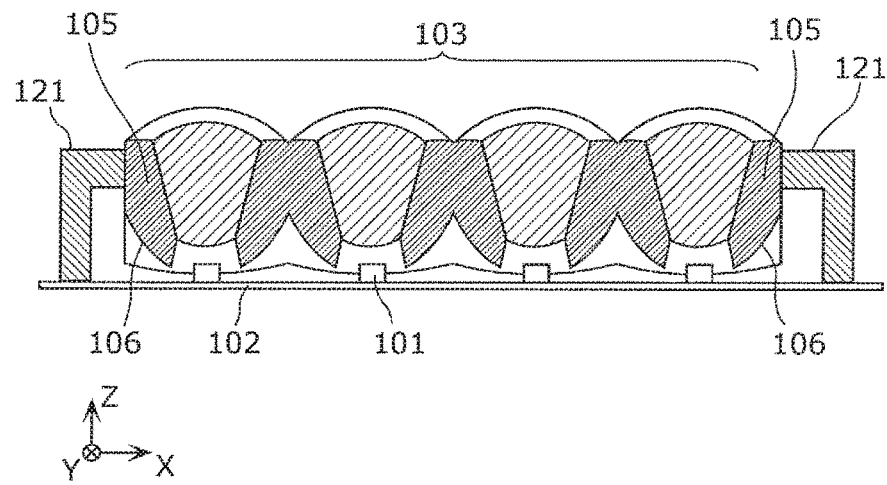
[FIG. 18B]
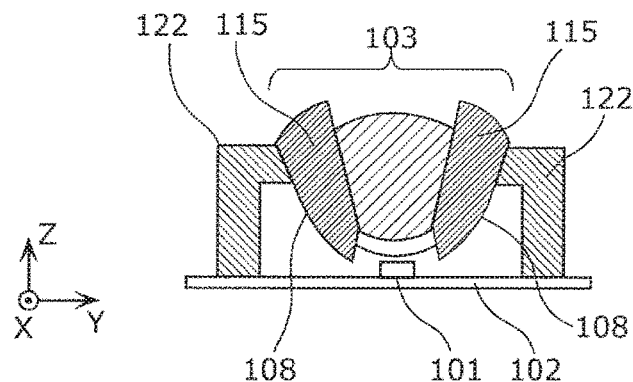
[FIG. 19]
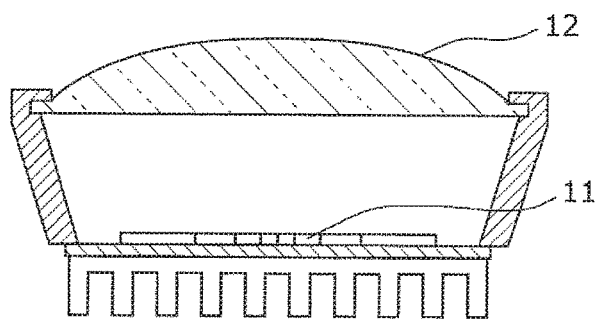
PRIOR ART

[FIG. 20]
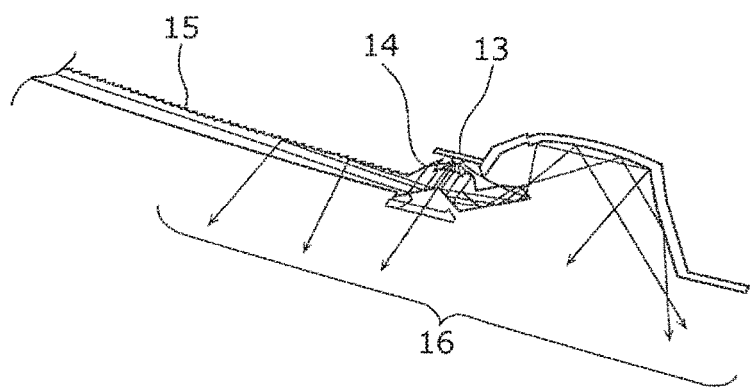
PRIOR ART

ILLUMINATION APPARATUS AND AUTOMOBILE EQUIPPED WITH SAME

CROSS-REFERENCE TO RELATED APPLICATIONS

This application is a U.S. national stage application of the PCT International Application No. PCT/JP2015/000903 filed on Feb. 24, 2015, which claims the benefit of foreign priority of Japanese patent application 2014-036328 filed on Feb. 27, 2014, the contents all of which are incorporated herein by reference.

TECHNICAL FIELD

The present invention relates to an illumination apparatus, such as a vehicle lighting device, that has a solid light-emitting element such as a light-emitting diode (LED) serving as a light source, as well as an automobile equipped with the same. In particular, the invention relates to a vehicle lighting device (so-called a daytime running light (DRL); a daytime lamp) that causes drivers of other vehicles, pedestrians, etc. to visually recognize the presence of the user's own car in daytime, as well as an automobile equipped with the vehicle lighting device.

BACKGROUND ART

Currently, with regard to DRLs, a standard for compliance has been set in Europe, and the USA, etc. It has been required that, in DRLs, the divergence of light includes a broad distribution in the horizontal direction with respect to the vertical direction.

As one conventional daytime running light (DRL), there is a DRL that emits light, which has been emitted from a light source, directly to the front direct ion using a lens or reflector. For example, there is a DRL that reduces high beams from the head light to change luminescence amounts of LED arrays, or the number of LED arrays emitting light so as to realize light distribution suitable for daytime running (for example, see Patent Literature 1).

FIG. 19 is a view that shows a conventional daytime running light described in Patent Literature 1. In FIG. 19, the daytime running light is a type in which the light is utilized also as a head light, and includes an LED array 11 having multiple LEDs and a lens 12. The light emitted from the LED array 11 is collimated by the lens 12. The light from LEDs close to the optical axis of the lens 12 is to be the light in the optical axis direction, i.e., in the front direction, and the light is emitted from the lens 12. On the other hand, the light from LEDS remote from the optical axis of the lens 12 is to be the light in the horizontal direction, and the light is emitted from the lens 12. Thus, in the daytime running light shown in FIG. 19, the luminescence amount of each LED of the LED array 11 is adjusted so as to realize light distribution suitable for daytime running.

Furthermore, as another example of a daytime running light, there is a daytime running light that uses a light guide plate to form a line-like light source (for example, see Patent Literature 2).

FIG. 20 is a view that shows a conventional daytime running light described in Patent Literature 2. In FIG. 20, the daytime running light includes a high-output LED 13, a light guide plate 14, and a prism 15 formed on the light guide plate 14. In addition, light 16 is also shown in FIG. 20. The light emitted from the high-out put LED 13 enters the light guide plate 14, and propagates through the light guide plate 14 while being totally reflected therein. When the light that has propagated through the light guide plate 14 enters the prism 15, a path of a part of the light is bent by the prism 15, and the part of the light deviates from conditions for the total reflection in the propagation thorough the light guide plate 14, and is emitted to the outside of the light guide plate 14.

CITATION LIST

Patent Literature

PTL 1: JP-A-2010-67417
PTL 2: JP-A-2012-169170

SUMMARY OF INVENTION

However, in the conventional daytime-running illumination apparatus of a type in which the light is used also as a head light, it is difficult to freely change the outer shape of the illumination apparatus. Therefore, with regard to such an illumination apparatus, for example, it is required that the illumination apparatuses are disposed in line diagonally in front of the vehicle body, so that the vehicle is easily visually recognized by other drivers or pedestrians. Consequently, there is a problem of lower freedom of the disposition.

Meanwhile, with regard to the conventional daytime-running illumination apparatus using a light guide plate, it is easy to form a line-shaped light source with excellent visibility and design properties, and the freedom of the disposition is also high. However, such an illumination apparatus has a problem of low light efficiency. Specifically, in the daytime-running illumination apparatus using a light guide plate, loss of light occurs when the light enters from the LEDs into the light guide plate, and large loss of light occurs when the light is extracted from the light guide plate. Consequently, the light efficiency is generally low.

In view of the above problems, as well as other concerns, an object is to provide an illumination apparatus that has high light efficiency, high freedom of disposition thereof, and excellent visibility, as well as an automobile including the illumination apparatus.

In order to achieve the above-mentioned object, one aspect of an illumination apparatus according to the invention relates to an illumination apparatus, including: multiple light sources and multiple lens units that are placed correspondingly to the respective multiple light sources, wherein each of the multiple lens units includes a transmission lens that is located above each of the multiple light sources, a first total-reflection lens that is located around the transmission lens in a direction parallel to an array direction of the multiple light sources, and a second total-reflection lens that is located around the transmission lens in a direction vertical to the array direction of the multiple light sources, wherein an incidence surface and an emission surface of the transmission lens are two-axis anamorphic aspherical surfaces, an incidence surface, an emission surface and a total-reflection surface of the first total-reflection lens and the second total-reflection lens are two-axis anamorphic aspherical surfaces, a microlens array is formed on at least one of the incidence surface and the emission surface of the transmission lens, a microlens array is formed on at least one of the emission surfaces, the total-reflection surfaces and the incidence surfaces of the first total-reflection lens and the second total-reflection lens, and the microlens arrays of the transmission lens, the first total-reflection lens and the second total-reflection lens each have a structure in which microlenses are periodically arrayed, and are arrayed along the vertical and horizontal directions of the illumination apparatus.

Furthermore, one aspect of the automobile according to the invention includes the above-described illumination apparatus.

According to one aspect of the illumination apparatus according to the invention, the illumination apparatus includes a light source, and a lens unit formed by a two-axis anamorphic aspherical surface, and a microlens array is formed on an emission surface of the lens unit such that the anamorphic aspherical surface forms an envelope; curve. Accordingly, the light emitted from, the light source turns into light fluxes with a size slightly larger than respective emission surfaces through the anamorphic aspherical surfaces of transmission lenses and total-reflection lenses.

Thus, since the emitted light will be recognized as a continuous line when the illumination apparatus is viewed, the light emitted from the illumination apparatus forms homogenous light fluxes over a broad angular range through the microlens array. As a result, an illumination apparatus with high visibility can be realized.

Moreover, almost all of the light emitted from the light source is emitted to the front direction by the transmission lens and total-reflection lenses disposed around the transmission lens. As a result, an illumination apparatus with high light efficiency can be realized.

Furthermore, since the illumination apparatus is configured by arraying multiple light sources and lens units, restrictions on positions of the vehicle body where the illumination apparatuses are placed can be eased by changing the array directions of the components. That is, an illumination apparatus with high freedom of disposition can be realized.

BRIEF DESCRIPTION OF DRAWINGS

FIG. 1A is a plan view that shows positions of illumination apparatuses in an automobile in a first embodiment.

FIG. 1B is a plan view that shows positions of illumination apparatuses in another automobile according to the first embodiment.

FIG. 2 is a cross-section view that schematically shows an illumination apparatus in the first embodiment.

FIG. 3 is a cross-sect ion view of the illumination apparatus shown in FIG. 2 where the illumination apparatus is sectioned in the vertical direction to the X axis.

FIG. 4A is a plan view of one lens unit shown in FIG. 1B where the lens unit is viewed from the Z-axis direction.

FIG. 4B is a cross-section view of the lens unit along the line B-B in FIG. 2.

FIG. 5A is an enlarged view of an emission surface of the lens unit in the first embodiment.

FIG. 5B is an enlarged view of an emission surface of the lens unit in the first embodiment.

FIG. 6 is a partially-enlarged view that schematically shows a microlens array in the first embodiment.

FIG. 7A is a view that shows light fluxes in a lens unit in the first embodiment.

FIG. 7B is a view that shows light fluxes in a lens unit in the first embodiment.

FIG. 8 is a view that shows divergence of light fluxes incident on the microlens array in the first embodiment.

FIG. 9 is a view that shows light fluxes emitted from a second arc and a fourth arc of the microlens array in the first embodiment.

FIG. 10 is a view that shows light fluxes emitted from a first arc and a third arc of the microlens array in the first embodiment.

FIG. 11 is a view that shows light fluxes emitted from the microlens array in the first embodiment.

FIG. 12 is a cross-section view that schematically shows an illumination apparatus in Variation Example 1.

FIG. 13 is a cross-section view that schematically shows another illumination apparatus in Variation Example 1.

FIG. 14A is a plan front view of an illumination apparatus in the first embodiment.

FIG. 14B is a plan front view of an illumination apparatus in Variation Example 2.

FIG. 14C is a plan front view of another illumination apparatus in Variation Example 2.

FIG. 14D is a plan front view of yet another illumination apparatus in Variation Example 2.

FIG. 15 is a partially-enlarged cross-section view that schematically shows a transmission lens and total-reflection lenses of an illumination apparatus in Variation Example 3.

FIG. 16 is a cross-section view that schematically shows an illumination apparatus in Variation Example 4.

FIG. 17 is view that schematically shows a microlens array of an illumination apparatus in Variation Example 5.

FIG. 18A is a cross-section view that schematically shows an illumination apparatus in Variation Example 6.

FIG. 18B is a cross-section that schematically shows another illumination apparatus in Variation Example 6.

FIG. 19 is a view that shows a conventional daytime running light described in Patent Literature 1.

FIG. 20 is a view that shows a conventional daytime running light described in Patent Literature 2.

DESCRIPTION OF EMBODIMENTS

Hereinafter, embodiments will be described with reference to drawings. In addition, all of the embodiments described below indicate preferable specific examples of the invention. Therefore, numerical values, shapes, materials, elements, and arrangement positions and connection configurations of the elements shown in the embodiments below are examples, and are not intended to limit the invention. Accordingly, among elements in the embodiments below, elements that are not described in independent claims, which indicate primary general ideas of the invention, will be described as optional elements.

Furthermore, the respective drawings are schematic views, and are not always precisely arranged in drawings. Therefore, for example, scales, etc. are not always consistent with each other in the respective drawings. In addition, identical symbols are provided to substantially identical elements in the respective drawings, and overlapping descriptions therefor will be omitted or simplified.

First Embodiment

FIGS. 1A and 1B are plan views that each show positions of illumination apparatuses 130 according to the first embodiment in automobiles 150. In FIGS. 1A and 1B, front edges of the automobiles 150 are shown.

As shown in FIGS. 1A and 1B, the illumination apparatuses 130 are placed on the left and right sides of the foreparts of the automobiles 150. For example, in FIG. 1A, the illumination apparatuses 130 are placed on diagonal parts of corners of the automobile 150. In addition, in FIG. 1B, the illumination apparatuses 130 are placed on parts of the automobile 150 that directly face the front.

It is required that, from the front view, the illumination apparatuses 130 emit homogenous light. For that reason, in the illumination apparatuses 130, it is favorable that the divergence of light is made broader in the horizontal direction than in the vertical direction so as to increase visibility to the persons and the oncoming cars.

FIGS. 2 and 3 are cross-sect ion views that each show illumination apparatuses 130 in the first embodiment. Sectional positions in FIGS. 2 and 3 correspond to positions that pass the center of an LED 101.

In FIG. 2, the upper side of the plane of the page is referred to as the Z-axis direction, the right direction is referred to as the X-axis direction, and the depth direction of the plane of the page is referred to as the Y-axis direction. In this coordinate system, the Z-axis direction corresponds to the front side (the front sides of the automobiles 150 in FIGS. 1A and 1B), the Y-axis direction corresponds to the vertical direction, the X-axis direction corresponds to the horizontal direction, and X-Z plane is on the plane of the page. Furthermore, FIG. 3 is a cross-section view of the illumination apparatus shown in FIG. 2 where the illumination apparatus is sectioned in a direction vertical to the X axis, and shows a view when FIG. 2 is viewed from the X-axis direction.

As shown in FIGS. 2 and 3, the illumination apparatus 130 includes a substrate 102, multiple LEDs (light sources) 101 that are mounted on the substrate 102, and multiple lens units 103 that are placed correspondingly to the respective multiple LEDs 101. In this embodiment, the multiple lens units 103 are located above (directly above) the respective multiple LEDs 101. The illumination apparatus 130 further includes a protective cover 110 that is located above the multiple lens units 103.

Each of the multiple lens units 103 includes a transmission lens 104 that is located correspondingly to each of the multiple LEDs 101, and total-reflection lenses 105 and 115 (FIG. 3) that are located in positions adjacent to the transmission lens 104. In this embodiment, each transmission lens 104 is located above each of the multiple LEDs 101. Furthermore, the total-reflection lenses 105 and 115 (FIG. 3) are located around the transmission lens 104.

The multiple LEDs 101 are arrayed on the substrate 102, i.e., on the X-Z plane, at approximately equal intervals. Light that has a light distribution almost the same as that of perfectly-diffused light is emitted from each LED 101. Furthermore, each LED 101 emits almost the same light fluxes so as not to cause unevenness in light sources.

<Transmission Lens 104>

The transmission lens 104 has an incidence surface (bottom surface) and an emission surface (top surface). Both of the incidence surface and the emission surface of the transmission lens 104 are two-axis anamorphic aspherical surfaces that have two cylindrical axes. In this embodiment, the two cylindrical axes of the anamorphic aspherical surfaces of the incidence surface and the emission surface of the transmission surface 104 are present within the X-Z plane and the Y-Z plane, respectively. The two-axis anamorphic aspherical surfaces have a shape formed by overlapping two cylindrical surfaces of anamorphic aspherical surfaces so as to be perpendicular to each other.

The light flux 31 is a light flux that transmits through the transmission lens 104. Due to refraction effects in the incidence surface of the transmission lens 104, the light flux 31 is enlarged or reduced. Thus, a two-axis anamorphic aspherical surface is used for the incidence surface of the transmission lens 104 in the illumination apparatus 130. Accordingly, the light flux 31 is distributed slightly more widely on the emission surface of the transmission lens 104 both in the X-Z and Y-Z planes, compared with the emission surface 104 of the transmission lens 104.

The curvature of the incidence surface of the transmission lens 104 is set in such a manner that the divergence of the light covers 0.5 to 1 cycle of a microlens (described with respect to FIGS. 5A and 5B below) in a microlens array 116 that is formed on emission surfaces 108 and 112 of the total-reflection lenses 105 and 115 adjacent to each other.

Light fluxes emitted from the transmission lens 104 and light fluxes emitted from the total-reflection lenses 105 and 115 slightly overlap with each other. Accordingly, a line-shaped light source that is continuous and seamless along the array direction of multiple LEDs 101 is formed.

The curvature of the emission surface of the transmission lens 104 is set in such a manner that the light flux 31 turns into light parallel to the front direction. However, since the light-emitting surface of each LED 101 is not a point light source but a surface light source with a size, the light emitted from the transmission lens 104 turns into light fluxes having directional divergence.

<Total-Reflection Lenses 105>

As shown in FIG. 2, the total-reflection lenses 105 (first total-reflection lenses) are located around the transmission lenses 104 in a direction parallel to the array direction of multiple LEDs 101. In this embodiment, the total-reflection lenses 105 are provided on surface portions of both sides of each transmission lens 104 in an array direction of multiple LEDs 101. In other words, a pair of total-reflection lenses 105 are provided on surfaces of both sides of one transmission lens 104.

More specifically, a pair of total-reflection lenses 105 are adjacent to each transmission lens 104 in the array direction of multiple LEDs 101 (X-axis direction), and are lenses that are formed into a single unit, together with a transmission lens 104, without any optical boundary faces therebetween.

The total-reflection lens 105 includes an incidence surface, an emission surface, and a total-reflection surface 106. The incidence surface, the emission surface and the total-reflection surface of the total-reflection lens 105 are two-axis anamorphic aspherical surfaces.

The lower edge of the incidence surface of the total-reflection lens 105 is located in the vicinity of the height of the light emission surface of the LIED 101 so that as many as possible of light fluxes from the LED 101 enter the total-reflection lens 105.

Light fluxes 32 are light fluxes that are from the LED 101 and that are incident on total-reflection surfaces 106 of total-reflection lens 105.

Light fluxes 33 are light fluxes that are caused from reflection of light fluxes 32 on total-reflection surfaces 106 and that enter total-reflection lenses 105.

Due to refraction effects in the incidence surfaces of the total-reflection lenses 105, light fluxes 32 are enlarged or reduced. Thus, in the illumination apparatus 130, two-axis anamorphic aspherical surfaces are used as the incidence surfaces of the total-reflection lenses 105. Therefore, curvatures of the incidence surfaces of total-reflection lenses 105 are set in such a manner that the light fluxes 32 outreach the total-reflection surfaces 106 of the total-reflection lenses 105 on both the X-Z and Y-Z planes.

Furthermore, when two-axis anamorphic aspherical surfaces are used for the total-reflection surfaces 106 of the total-reflection lenses 105, light fluxes 33 will be slightly larger than the transmission surfaces of the total-reflection lenses 105 on both the X-Z and Y-Z planes.

Curvatures of emission surfaces of the total-reflection lenses 105 are set in such a manner that light fluxes therefrom turn into light parallel to the front direction in the same manner as the light fluxes emitted from the transmission lenses 104.

<Total-Reflection Lenses 115>

As shown in FIG. 3, total-reflect ion lenses 115 (second total-reflection lenses) are located around each transmission lens 104 in a direction vertical to the array direction of multiple LEDs 101. In this embodiment, total-reflection lenses 115 are provided on surfaces of both sides of each transmission lens 104 in a direction perpendicular to the array direction of multiple LEDs 101. In other words, a pair of total-reflection lenses 115 are provided on surfaces of both sides of one transmission lens 104.

More specifically, a pair of total-reflection lenses 115 are adjacent to each transmission lens 104 in a direction perpendicular to the array direction of multiple LEDs 101 (Y-axis direction), and are lenses that are formed into a single unit, together with a transmission lens 104, without any optical boundary faces therebetween.

The total-reflection lens 115 includes an incidence surface, an emission surface, and a total-reflection surface 107. The incidence surface, the emission surface and the total-reflection surface of the total-reflection lens 115 are two-axis anamorphic aspherical surfaces.

The lower edge of the incidence surface of the total-reflection lens 115 is located in the vicinity of the height of the light emission surface of the LED 101 so that as many as possible of light fluxes from the LED 101 enter the total-reflection lens 115.

light fluxes 35 are light fluxes that enter the total-reflection lenses 115, and light fluxes 36 are light fluxes that are reflected on total-reflection surfaces 107 of the total-reflection lenses 115 and that travels to the emission surfaces.

In the same manner as emission surfaces of total-reflection lenses 105 (FIG. 2), curvatures of emission surfaces of total-reflection lenses 115 are set in such a manner that the light fluxes therefrom turn into light parallel to the front direction.

The area of the incidence surface and the area of the emission surface of the transmission lens 104, the area of the incidence surface and the area of the emission surface of the total-reflection lens 105, and the area of the incidence surface and the area of the emission surface of the total-reflection lens 115 are set, respectively, in such a manner that the luminance on the emission surface of the transmission lens 104, the luminance on the emission surface of the total-reflection lens 105 (FIG. 2), and the luminance on the emission surface of the total-reflection lens 115 are approximately equal.

For example, as the area of the incidence surface of each lens is larger, incidence light fluxes from the LED 101 increase, and the luminance on the emission surface will be higher. Therefore, the area of the incidence surface of each lens is made smaller, or the area of the emission surface of each lens is made larger, thereby adjusting the luminance on the emission surface of each lens.

<Lens Units 103>

As described above, each of the multiple lens units 103 is configured by the transmission lenses 104, the total-reflection lenses 105 and the total-reflection lenses 115. The multiple lens units 103 and the multiple LEDs 101 are placed one-on-one, correspondingly to each other.

The multiple lens units 103 are each configured in single units such that there is no optical boundary faces between adjacent lens units 103. Materials of the transmission lens 104, the total-reflection lens 105 and the total-reflection lens 115 are transparent resins such as polycarbonates or acrylics, or translucent materials such glass. Furthermore, since the illumination apparatus 130 may be exposed to sunlight, the transmission lens 104, the total-refection lens 105 and the total-reflection lens 115 are preferably made of a highly weather-resistant material.

FIG. 4A is a plan view of one lens unit 103 when it is viewed from the Z-axis direction in FIG. 1B. The emission surface of one lens unit 103 is approximately square-shaped, and is configured by combination of the lens unit 103, the total-reflection lenses 105, and the total-reflection lens 115.

FIG. 4B is a cross-section view along the line B-B in FIG. 2. The outer shape of each lens unit 103 is a shape that encloses an LED 101 corresponding to the lens unit 103, e.g. a shape that is similar to a rectangle. In each lens unit 103, total-reflection lenses 105 and total-reflection lenses 115 are placed around an LED 101. Incidence surfaces of the total-reflection lenses 105 and 115 are two-axis anamorphic aspherical surfaces, and therefore, have shapes with curvatures.

In cases where the incidence surfaces and the total-reflection surfaces are formed in such a manner that the cross-sectional shape of the lens unit 103 forms into a spherical shape, loss of light likely occurs when light fluxes from LEDs 101 are converted into a rectangle on the emission surfaces. Therefore, in this case, the total-reflection lenses 105 and the total-reflection lenses 115 are used, and are placed in such a manner such that the incidence surface of the lens unit 103 is approximately rectangular.

<Emission Surfaces 108 and 112>

The emission surface 108 shown by a dashed line in FIG. 2, shows a cross-section of the emission surface of the lens unit 103 along the X-Z plane. The emission surface 108 is formed by cross-sections of the emission surfaces of the transmission lenses 104 and the emission surfaces of the total-reflection lenses 105.

The emission surfaces 112 shown by dashed lines in FIG. 3 snow cross-sections of the emission surfaces of the lens unit 103 along the Y-Z plane. The emission surfaces 112 are formed by cross-sections of the emission surface of the transmission lens 104 and the emission surfaces of the total-reflection lenses 115.

A microlens array is formed on at least one of the incidence surface and the emission surface of the transmission lens 104. Furthermore, a microlens array is formed on at least one of the emission surface, the total-reflection surface and the incidence surface of each of the total-refection lenses 105 and 115. The microlens arrays have a structure in which microlenses are periodically arrayed, and are arrayed along the vertical and horizontal directions of the illumination apparatus 130. Hereinafter, one example of the microlens array will be described by use of FIGS. 5A and 5B.

FIG. 5A is an enlarged cross-section view of the emission surface 108, and FIG. 5B is an enlarged cross-section view of the emission surface 112.

As shown FIGS. 5A and 5B, a microlens array 116 that have multiple microlenses arrayed at a cycle S is formed on each of the emission surfaces 108 and 112. Envelope curves 125 of the emission surfaces 108 and 112 indicate respective 2-axis anamorphic aspherical surfaces of transmission lenses 104 and the total-reflection lenses 105.

The array directions of microlenses in the microlens array 116 are vertical and horizontal directions of the illumination apparatus 130, regardless of the array directions of LEDs 101 and lens units 103. The emission surface 108 and the emission surface 112 have different lens curvatures of the respective microlens in the microlens arrays 116.

FIG. 6 is a partially-enlarged view of the cross-sectional shape of the microlens array 116 along the vertical direction.

As shown in FIG. 6, the microlens array 116 has a periodic structure, is formed by four arcs, namely a first arc 51, a second arc 52, a third arc 53 and a fourth arc 54. Adjacent two arcs among the four arcs in the microlens array 116 are continuous in such a manner that slopes of the tangent lines thereof are consistent. For example, adjacent two arcs are smoothly connected to each other such that inclination angles of the tangent lines are equal. In addition, in FIG. 6, the first arc 51 forms the part of trough, the third arc 53 forms a peak, and the second arc 52 and the fourth arc 54 form slopes.

The dashed line shown in FIG. 6 shows a tangent line on a connection point between the first arc 51 and the second arc 52. It is favorable that there is a tangent line with the same slope between the first arc 51 and the second arch 5. Furthermore, when the connection between the arcs smoothly changes, unevenness in the light can be suppressed.

In addition, with regard to the second arc 52 and the third arc 53, the third arc 53 and the fourth arc 54, and the fourth arc 54 and the first arc 51, tangent lines are not shown in the figures. However, these tangent lines are the same as the case of the first arc 51 and the second arc 52.

The cross-section of the microlens array 116 in the horizontal direction also has the same cross-section structure as the cross-section structure in the vertical direction. However, in order to make light divergence different between the vertical direction and the horizontal direction, the cycles, curvatures of the arcs, and heights of peaks and troughs of arcs are different between the vertical direction and the horizontal direction.

The divergence of light fluxes of emitted light is arranged to be different between the vertical direction and the horizontal direction of the illumination apparatus 130. Specifically, the light divergence in the horizontal direction is arranged to be broader than the light divergence in the vertical direction, thereby enhancing the visibility. Therefore, heights and curvatures of the four arcs of the microlens array 116 are arranged to be different between those of the emission surface 108, which is a cross-section of the X-Z plane, and those of the emission surface 112, which is a cross-section of the Y-Z plane.

Specifically, slopes of the second arc 52 and the fourth arc 54 are arranged to be larger in the emission surface 108 of the X-Z cross-section that influences on the divergence of light fluxes in the horizontal direction.

On the other hand, slopes of the second arc 52 and the fourth arc 54 are arranged to be smaller in the emission surface 112 of the Y-Z cross-section that influences on the divergence of light fluxes in the vertical direction.

When such emission surfaces 108 and 112 are formed, the divergence of light fluxes in the horizontal direction can be made broader than the divergence of light fluxes in the vertical direction.

When inclination angles of the second arc 52 and the fourth arc 54 are made small, the heights of lenses of the microlenses of the microlens array 116 will be small, and when the inclination angles are made large, the heights of lenses of the microlenses of the microlens array 116 will be large. Consequently, the appearance of the lens unit 103 looks as if there are deep groove lines in the vertical direction and there are shallow groove lines in the horizontal direction.

In addition, the microlens array 116 may favorably be arranged at least two more cycles on the lens unit 103, and, by increasing the number of cycles, it can be caused to look more even lines.

<Protective Cover 110>

As shown in FIGS. 2 and 3, the protective cover 110 is a translucent cover that is transparent and that has an approximately even thickness. A part of cross-section of the protective cover 110 at sides of the emission surfaces 108 and 112 of the lens unit 103 is shown in FIGS. 2 and 3. The material of the protective cover 110 is a transparent resin such as a polycarbonate or acrylic, or glass or the like. The material of the protective cover 110 is favorably a material that has weather resistance and ultraviolet absorption effects. By reducing ultraviolet rays with the protective cover 110, damages to the lens units 103 due to ultraviolet rays can be reduced.

<Divergence of a Light Flux 31, a Light Flux 33 and a Light Flux 36>

FIG. 7A is a schematic diagram that shows light fluxes 31 and 33 inside lenses of the transmission lens 104 and the total-reflection lenses 105 within the X-Z plane. In FIG. 7A, the light fluxes 31 and 33 are shown only in the lenses present in the central portion.

The light flux 31 that enters the transmission lens 104 and that is emitted therefrom is enlarged or reduced on the two-axis anamorphic aspherical surface of the incidence surface, and travels to the emission surface of the transmission lens 104. At that time, the anamorphic aspherical surface is set in such a manner that the width W1 of the light flux 31 within the X-Z plane is larger than the width of the emission surface of the transmission lens 104 by at least one cycle, preferably two or more cycles of the microlens array 116.

In the same manner, the light flux 33 that has been reflected on the total-reflection surface 106 of the total-reflection lens 105 is enlarged or reduced on the two-axis anamorphic aspherical surface of the total-reflection surface 106, and travels to the emission surface of the total-reflection lens 105. At that time, the anamorphic aspherical surface is set in such a manner that the width W3 of the light flux 33 within the X-Z plane is larger than the width of the emission surface of the total-reflection lens 105 by at least one cycle, preferably two or more cycles of the microlens array 116.

FIG. 7B is a schematic diagram that shows light fluxes 31 and 36 inside the lenses of the transmission lens 104 and the total-reflection lenses 115 within the Y-Z plane. The light flux 31 that enters the transmission lens 104 is enlarged or reduced on the two-axis anamorphic aspherical surface of the incidence surface, and travels to the emission surface of the transmission lens 104. At that time, the anamorphic aspherical surface is set in such a manner that the width W1 of the light flux 31 within the X-Z plane is larger than the width of the emission surface of the transmission lens 104 by at least one cycle, preferably two or more cycles of the microlens array 116.

The light flux 36 that has been reflected on the total-reflection surface 107 of the total-reflection lens 115 is enlarged or reduced on the two-axis anamorphic aspherical surface of the total-reflection surface, and travels to the emission surface of the total-reflection lens 115. At that time, the anamorphic aspherical surface is set in such a manner that the width W6 of the light flux 36 within the X-Z plane is extended to the side of the transmission lens 104 by at least 0.5 cycle, preferably one or more cycles of the microlens array 116.

<Behaviors>

Behaviors of the illumination apparatus 130 (daytime running light) configured in the above-described manner will be described.

In FIGS. 2 and 3, the light flux 31 emitted from the LED 101 falls on the incidence surface of the transmission lens 104 placed directly above the LED 101. Since the incidence surface of the transmission lens 104 is an aspherical anamorphic surface, on the emission surface of the transmission lens 104, the light flux 31 is slightly larger than the emission surface of the transmission lens 104, and has a size such that it slightly overlaps with adjacent total reflection lenses 105 and 115. Furthermore, due to refraction effects on the emission surfaces 108 and 112 of the transmission lens 104, the light flux 31 is emitted therefrom in such a manner that the central direction of the divergence of the light flux 31 is consistent with the front direction. Since the microlens arrays 116 (FIGS. 5A and 5B) are formed on the emission surfaces 108 and 112 of the transmission lens 104, the emitted light forms light fluxes that extend to the vertical and horizontal directions.

<Divergence of Light Fluxes by the Microlens Array 116>

FIGS. 8 to 11 are diagrams that illustrate divergence of light fluxes by the microlens array 116. The microlens array 116 is practically formed on the two-axis anamorphic aspherical surface. However, in order to simplify the illustration, examples of the microlens array 116 that are planar are shown in FIGS. 8 to 11.

FIG. 8 is a diagram that shows divergence of light fluxes that are incident on the microlens array 116. The light fluxes that are incident on the microlens array 116 are light fluxes that have been formed by parallelizing the light emitted from the LED 101, and therefore, have been formed into light fluxes having a certain level of directionality. Since the light emission surface of the LED 101 is small, the longer the focal point distances of the transmission lens 104 and the total-reflection lens 105 are, the higher the directionality of the light fluxes.

FIG. 9 is a diagram that shows divergence of light fluxes that have been emitted from the second arc 52 and the fourth arc 54 (FIG. 6) when the light fluxes in FIG. 8 enter the microlens array 116.

Since the second arc 52 and the fourth arc 54 correspond to an inclined surface of a prism, they have an effect to change the orientation of light fluxes. Furthermore, since the second arc 52 and the fourth arc 54 have curvatures, they also have an effect to spread the light fluxes. Accordingly, the light flux 52h emitted from the second arc 52 and the light flux 54h emitted from the fourth arc form into a combined light flux G that is formed by spreading the light distribution in FIG. 8 and horizontally displacing the orientations of the distribution, thus overlapping them.

FIG. 10 is a diagram that shows divergence of light fluxes emitted from the first arc 51 and the third arc 53 (FIG. 6) when the light fluxes in FIG. 8 enters the microlens array 116.

The light flux 51h emitted from the first arc 51 and the light flux 53h emitted from the third arc 53 get into a state in which the light divergence of light fluxes in FIG. 2 has spread due to lens effects.

FIG. 11 is a diagram that shows light fluxes emitted from the microlens array 116. FIG. 11 shows combination of FIGS. 9 and 10, namely divergence of light fluxes in a case where light fluxes emitted from the first arc 51 and the fourth arc 54 are overlapped.

The light flux 52h and the light flux 54h spread the width of the divergence of the light fluxes. The light flux 51h and the light flux 53h fill the central portion of the light fluxes.

As a result, uniform combined light fluxes G can be emitted at a large azimuth angle, and thus, visibility of the illumination can be enhanced.

<Light on the Total-Reflection Lenses 105 and 115>

In FIG. 2, diagonal light fluxes 32 that have been emitted from LEDs 101 and that travel to the left and right sides enter total-reflection lenses 105. The light fluxes 32 are enlarged or reduced within the X-Z and Y-Z planes of the two-axis anamorphic aspherical surfaces on incidence surfaces of the total-reflection lenses 105 at different magnifications, respectively.

The whole incident light flux 32 is incident on the total-reflection lens 105, and is reflected as a light flux 33. The total-reflection lens 105 also has a two-axis anamorphic aspherical surface.

The size of the light flux 33 is slightly increased by the emission surface of the total-reflection lens 105, and then, the light flux 33 is emitted therefrom. Due to the emission surface, the light emitted from the total-reflection lens 105 is emitted in such a manner that the center of the light flux faces the front direction. A microlens array 116 (FIG. 5A) is formed on the emission surface of the total-reflection lens 105. Accordingly, in the same manner as the light emitted from the transmission lens 104, the light emitted from the total-reflection lens 105 forms into light fluxes that are distributed in the vertical and horizontal directions.

In the same manner, in FIG. 3, a diagonal light flux 35 that is emitted from an LED 101 and that travels upward obliquely enters the total-reflection lens 115. In other words, the light flux 35 is incident on the anamorphic aspherical surface, is totally reflected, is formed into a light flux 36, and is formed into a light flux that distributes in the vertical and horizontal directions by the microlens array 116 (FIG. 5B) formed on the emission surface.

Since the light fluxes emitted from the transmission lens 104 and the light fluxes emitted from, the total reflection lenses 105 and 115 slightly overlap with each other, a line-shaped light source that is continuous and seamless along the array direction of multiple LEDs 101 is formed.

<Divergence of the Entire Light>

When the illumination apparatus 130 is viewed from the front, the total-reflection lenses 105, the total-reflection lenses 115, and the transmission lens 104 are recognized as a square shape. For example, when the illumination apparatus 130 is viewed from the front, two total-reflection lenses 105, and two total-reflection lenses 115 surround the transmission lens 104, and the entire of the total-reflection lenses 105, the total-reflection lenses 115 and the transmission lens 104 is recognized as a square shape.

In this embodiment, as shown in FIG. 4A, the transmission lens 104, the total-reflection lenses 105 and the total-reflection lenses 115 are combined to form the emission surface of the lens unit 103, and thus, the general shape of the emission surface is rectangular. As described above, light fluxes from the LED 101 are enlarged or reduced by the respective lenses in such a manner that they slightly overlap with each other on emission surfaces of the respective lenses.

Moreover, since areas of the incidence surfaces and the emission surfaces of the respective lenses are adjusted, the luminance levels on the emission surfaces of the respective lenses are equal. Accordingly, by arraying lens units 103, an even line-shaped light source can be formed.

Furthermore, as shown in FIG. 4B, light fluxes from the LED 101 is caused to enter the lenses with incidence surfaces approximately square-shaped, and two-axis anamorphic aspherical surfaces are used, thereby causing almost no loss of light, and spreading the light fluxes on the emission surfaces with a square shape.

As described above, the illumination apparatus 130 includes LEDs 101 and lens units 103 that are formed by two-axis anamorphic aspherical surfaces. A microlens array 116 is formed on the emission surface of the lens unit 103 such that the anamorphic aspherical surface indicates an envelope curve 125 (FIGS. 5A and 5B). Accordingly, the light emitted from the LED 101 is formed into a light flux that has a size slightly larger than the size of the emission surface of each lens, by the anamorphic aspherical surfaces of the transmission lens 104, and the total-reflection lenses 105 and 115.

Thus, since the emitted light appears line-shaped and continuous when the illumination apparatus 130 is viewed, the light emitted from the illumination apparatus 130 form a uniform light flux within a broad angle range through the microlens array 116. As a result, an illumination apparatus 130 with high visibility can be realized.

Moreover, almost all of the light emitted from the LED 101 is emitted to the front direction by the transmission lens 104 and the total-reflection lenses 105 and 115, which are placed around the transmission lens 104. Accordingly, an illumination apparatus with high light efficiency can be realized.

Furthermore, the illumination apparatus 130 includes a pair of one LED 101 and one lens unit 103 corresponding to the one LED 101. Accordingly, by changing the direction of the array of the multiple pairs, restrictions on positions of the vehicle 150 where the illumination apparatuses 130 are located are eased. In other words, an illumination apparatus with high flexibility in its disposition can be realized.

Furthermore, in the illumination apparatus 130, the total-reflection lenses 105 and the total-reflection lenses 115 surround the LED 101. Additionally, the total-reflection lenses 105 and the total-reflection lenses 115 each have a nearly rectangular shape.

Accordingly, loss of the light can be reduced when incident light fluxes are converted to rectangular light fluxes on the emission surfaces of the lens unit 103, in addition, if light fluxes from the LED 101 are received by the incidence surface and the total-reflection surface that each have circular cross-sections, loss of the light likely occurs when the incident light fluxes are converted to rectangles on the emission surfaces.

Furthermore, in this embodiment, most of light fluxes that are incident on the transmission lens 104 are enlarged or reduced without any spaces on the emission surfaces due to effects of the two-axis anamorphic aspherical surfaces, and are emitted from the transmission lens 104. Meanwhile, also in the total-reflection lenses 105 and 115, most of incident light fluxes are enlarged or reduced without any spaces on the emission surfaces due to effects of the two-axis anamorphic aspherical surfaces, and are emitted from the total-reflection lenses 105 and 115. Accordingly, a light propagation distance for mixing light fluxes that extend over multiple lenses, thereby forming a line-shaped light flux, is not required, and therefore, the height of the lens unit 103 can be made small.

Variation Examples

<Light Source>

In the above-described embodiment, the LED 101 is used as a light source. However, other solid light-emitting elements such as EL (electroluminescence) elements may be used, or existing light sources such as halogen lamps may be used.

<Disposition>

In the above-described embodiment, the LEDs 101 are arrayed in line on the tabular substrate 102. However, LEDs 101 may be placed on a flexible substrate that can be bent freely, thereby placing the LEDs 101 in a curved line.

In the above-described embodiment, light source units including LEDs 101, the substrate 102 and the lens units 103 are placed within the X-Z plane (placed on the horizontal plane). However, disposition directions of microlens arrays 116 may be arranged as the vertical and horizontal directions, and light source units may be placed at any inclination angle.

For example, as shown in FIG. 12, the array direction of LEDs 101 may be inclined in the light source unit. That is, the array direction may be inclined within the X-Z plane. FIG. 12 is a cross-section view that schematically shows an illumination apparatus in Variation Example 1, and, for example, shows a view in a case where the illumination apparatus in the first embodiment is placed such that the illumination apparatus is inclined.

FIG. 12 is a diagram that corresponds to FIG. 2. In this case, when light fluxes from LEDs 101 can sufficiently be captured on incidence surfaces of transmission lenses 104, the size of each total-reflection lens 105 in the array direction of LEDs 101 may be made small, or one of the pair of the total-reflection lenses 105 may be omitted, and a total-reflection lens 105 may be provided at only one side of the translucent lens 104.

Furthermore, as shown in FIG. 13, the light source unit may be inclined within a plane vertical to the array direction of LEDs 101. That is, the light source unit may be inclined within the Y-Z plane. In this case, when light fluxes from LEDs 101 can sufficiently be captured on incidence surfaces of transmission lenses 104, the size of each total-reflection lens 115 in the array direction of LEDs 101 may be made small. Alternatively, the light source unit may be inclined within both the X-Z plane and the Y-Z plane.

FIGS. 14A to 14D are views that each show array states of lens units 103 when the illumination apparatus 130 is viewed from the front. As shown in FIG. 14A, the array state of lens units 103 is not limited to a case where they are arrayed in the horizontal direction. They may be arrayed in the diagonal direction as shown in FIG. 14B, they may be arrayed in a curved line as shown in FIG. 14C, or they may be arrayed in the vertical direction as shown in FIG. 14D.

In that case, by arranging the array directions of microlens arrays 116 as the vertical direction (i.e., the Y-axis direction) and the horizontal direction (i.e., X-axis direction), the divergence of light fluxes can efficiently be spread in the vertical direction and in the horizontal direction.

<Lens Shape>

In FIG. 3, a difference in the level is provided between emission surfaces of the transmission lens 104 and the total-reflection lens 115. However, as shown in FIG. 15, the difference may be made small, or no difference may be provided therein.

In addition, when the array intervals of LEDs 101 are large, total-reflection lenses 120 with the same configurations as those of the total-reflection lenses 105 may be added between the transmission lenses 104 and the total-reflection lenses 105, as shown in FIG. 16. In other words, in the illumination apparatus in the first embodiment, the number of total-reflection lenses may be increased.

<Surface Treatment>

Furthermore, an antireflection film, or an antireflection structure based on a microstructure can be formed on a part of the lens unit 103 other than the total-reflection surfaces 106 and 107, thereby improving the light intensity by about 4% per surface, i.e. by about 8% per two surfaces, although the cost will increase.

In addition, a reflection surface may be formed on the total-reflection surfaces 106 and 107 by way of aluminum deposition, silver deposition or the like. In this case, although the reflectivity decreases, influences on contamination can be reduced.

<Connection Between Lenses>

The lens unit 103 is configured by integrally forming the transmission lens 104, and the total-reflection lenses 105 and 115 in the above description. However, the transmission lens 104, the total-reflection lenses 105, and the total-reflection lenses 115 may be prepared as separate members, and these lenses may be joined with a transparent adhesive having almost the same refraction index as those of these lenses.

In addition, the transmission lens 104 and the total-reflection lenses 105 are formed into a single unit without any optical boundary faces therebetween in the above description. However, they are not limited to this configuration. For example, the transmission lens 104 and the total-reflection lenses 105 may be independent with each other, and optical boundary faces may be provided between them, although the assemblability would be inferior.

Furthermore, the multiple lens units 103 are formed into a single unit without any optical boundary faces therebetween. However, one LED 101 and one lens unit 103 are paired, and the pairs are made independent with each other, thereby providing optical boundary faces between respective lens units 103. By holding the substrate 102 against every lens unit 103, a position gap between the LED 101 and the lens unit 103 due to a difference in the thermal expansion rates of the substrate 102 and the lens unit 103 can be prevented. Therefore, deteriorations in the optical properties, i.e., reductions in light fluxes to the front direction can be prevented.

<Array of Lenses>

In the above-described embodiment, the arrangement of LEDs 101 and lens units 103 is shown as one row in figures. LEDs 101 and lens units 103 may be arranged in multiple rows, i.e., two or more rows.

Moreover, the numbers of LEDs 101 and lens units 103 are not limited to the numbers shown in figures.

Furthermore, the cross-section of the microlens array 116 is formed of four arcs because of an excellent view in the optical design in the above description. However, they may further be divided, and multiple arcs, i.e. four or more arcs, may be included. Alternatively, an aspherical cross-section may be adopted as a cross-section of the microlens array 116.

Furthermore, the array directions of microlens arrays 116 are arranged in the vertical and horizontal directions in the above description. However, they may be formed by rotating them around the Z axis within an allowable range of angle distributions of light fluxes emitted from the illumination apparatus 130. By rotating them around the Z axis, the angle distributions of light fluxes will also rotate.

Furthermore, the protective cover 110 may be omitted in cases where any contaminations on lenses cause no problems.

Furthermore, although widths of light fluxes on the emission surfaces of the transmission lens 104, the total-reflection lens 105 and the total-reflection lens 115 are caused to overlap with each other by 0.5 to 1 cycle of the microlenses formed on emission surfaces of the adjacent lenses in the above description, they may be overlapped with each other by one or more cycles thereof. However, in that case, since, with regard to light fluxes to adjacent lenses, an amount of light fluxes to the front direction is small, the frontal light fluxes will be reduced. Therefore, the light fluxes are overlapped with each other preferably by about 0.5 to 1 cycle.

Furthermore, the microlens arrays 116 are formed on the emission surfaces in the above description. However, the microlens array 116 maybe formed on any one of emission surfaces, total-reflection surfaces and incidence surfaces. However, when the microlens array 116 is formed in any side close to the LEDs 101, the divergence of the light emitted from the microlens array 116 will be broad. Consequently, leakage light will increase, and the light efficiency of the illumination apparatus 130 will slightly decrease. Therefore, in view of the light efficiency, the microlens array 116 is preferably formed on the side of the emission surfaces.

Furthermore, the microlens arrays 116 formed on emission surfaces of transmission lenses 104 have a curvature and inclination different from those of microlens arrays 116 formed on emission surfaces of the total-reflection lenses 115 and 105.

Furthermore, the cross-sectional shape of the microlens array 116 is a shape formed by combining arcs in the above description. However, an aspherical shape may be used therefor. Additionally, the cross-sectional shape of the microlens array 116 is a periodic structure that is obtained by forming one cycle with four arcs as shown in FIG. 6 in the above description. However, a simpler shape that is formed with a linear portion T and an arc C, which is an aspherical surface, as shown in FIG. 17, may be used therefor. In other words, the cross-sectional shape of the microlens in the microlens array 116 may be a shape that is formed by joining the arcs with lines.

As a cross-sectional shape of the microlens array 116, a simpler shape that is obtained by arranging, as one cycle S, a linear portion T and an aspherical arc C, as shown in FIG. 17, may be used. In this case, light fluxes with small divergence to the frontal direction are mainly emitted from the linear portion T. Moreover, light fluxes with large divergence are emitted from the aspherical arc C through refraction. In broad terms, by making the average curvature radius of the arc C small, light fluxes with larger divergence will be produced. Furthermore, by changing a coefficient of the aspherical surface, and a ratio of widths of the linear portion T and the arc C, the divergence of emitted light fluxes can finely be adjusted.

Also in FIG. 17, by adjusting the aspherical arc C, the divergence of light fluxes can be adjusted in the same manner as FIG. 6. However, since, in the shape of FIG. 6, arcs are more highly divided between functions to some degree, it is easy to adjust the divergence of light fluxes. Although the upper side of the shape of the arc C is configured as a projected part in FIG. 17, the upper side may be configured as a recessed part. Additionally, the cross-sectional shape of the microlens array 116 may be arranged as a shape of combination in which the X-Z cross-sectional shape is configured in the manner described in FIG. 6 and the Y-Z cross-sectional shape is configured in the manner described in FIG. 17, or may be arranged as a shape based on the opposite combination.

Furthermore, the cross-sectional shape of the microlens array 116 may be a sinusoidal shape although adjustment items will be less in this case.

<Holding Part>

Furthermore, as shown in FIGS. 18A and 18B corresponding to FIGS. 2 and 3, respectively, in the illumination apparatus 130 in the above-described embodiment, a flange 121 (holding part) may be provided in an area of the inside of the lens unit 103 where light fluxes are not present. By providing flanges 121 at the both ends of the array of the lens unit 103 as shown in FIG. 18A of the X-Z cross-section, the lens unit 103 may be fixed onto the substrate 102.

Since a region where almost no light fluxes are present exists above the total-reflection surface 106 of the total-reflection lens 105, optical properties of the illumination apparatus will not change even when a projected shape such as a flange 121 is added to the region. Furthermore, by providing flanges 122 in the lens unit 103 in the same manner, as described in FIG. 18B of the Y-Z cross-section, the lens unit 103 may be fixed onto the substrate 102.

Since a region where almost no light fluxes are present exists above the total-reflection lens 115, optical properties of the illumination apparatus will not change even when a projected shape such as a flange is added to the region. Furthermore, by forming embossed shapes or prism shapes on surfaces of flanges 121 and 122, the substrate 102 may be prevented from being viewable directly from the outside. Materials of flanges 121 and 122 may be transparent materials in the same manner as the lens unit, or may be non-transparent materials.

<Protective Cover 110>

The protective cover 110 (FIGS. 2 and 3) may be configured by a curved surface. In cases where the protective cover 110 is formed into a curved surface shape, the orientation and divergence of emitted light may slightly be changed due to effects of lenses. In cases where the orientation and the divergence change, the orientation and the divergence of the emitted light may be corrected in the microlens array 116 formed in the lens unit 103.

<Transmission Lens 104>

In the above-described embodiment, the lens unit 103 is configured by the transmission lens 104, the total-reflection lenses 105 and total-reflection lenses 115. However, in cases where the height of the lens unit 103 is made sufficiently large and distances between adjacent. LEDs 101 are made large to cause all of light fluxes from LEDs 101 to be incident on the total-reflection lenses 105 and total-reflection lenses 115, transmission lenses 104 may be omitted.

INDUSTRIAL APPLICABILITY

The illumination apparatus according to the invention can be used as a vehicle lighting device or the like installed in automobiles, etc. However, the illumination apparatus may be used for illumination purposes other than use in automobiles. For example, the illumination apparatus according to the invention can also be applied as a spot illumination or the like in housings or various facilities.

REFERENCE SIGNS LIST

11 LED array
12 lens
13 high-output LED
14 light guide plate
15 prism
16 light
31, 32, 33, 35, 36 light fluxes
51 first arc
51h light flux emitted from first arc
52 second arc
52h light flux emitted from the second arc
53 third arc
53h light flux emitted from the third arc
54 fourth arc
54h light flux emitted from the fourth arc
W1, W3, W6 widths
101 LED
102 substrate
103 lens unit
104 transmission lens
105, 115, 120 total-reflection lenses
106, 107 total-reflection surfaces
108 emission surface
110 protective cover
112 emission surface
116 microlens array
121, 122 flanges
125 envelope curve
130 illumination apparatus
150 automobile
C arc
G combined light fluxes
S cycle
T linear portion

The invention claimed is:

1. An illumination apparatus, comprising:
multiple light sources: wherein each of the multiple light sources is a light emitting diode; and
multiple lens units, wherein each of the multiple lens units is placed correspondingly to a respective one of the multiple light sources, wherein
each of the multiple lens units include
  a transmission lens that is placed correspondingly to each of the multiple light sources,
  a first total-reflection lens that is placed in a position adjacent to the transmission lens in a direction parallel to an array direction of the multiple light sources, and
  a second total-reflection lens that is placed in a position adjacent to the transmission lens in a direction vertical to the array direction of the multiple light sources, wherein
an incidence surface and an emission surface of the transmission lens are two-axis anamorphic aspherical surfaces,
an incidence surface, an emission surface and a total-reflection surface of the first total-reflection lens and the second total-reflection lens are two-axis anamorphic aspherical surfaces,
a microlens array is formed on at least one of the incidence surface and the emission surface of the transmission lens,
a microlens array is formed on at least one of the emission surfaces, the total-reflection surfaces and the incidence surfaces of the first total-reflection lens and the second total-reflection lens,
the microlens arrays of the transmission lens, the first total-reflection lens and the second total-reflection lens each have a structure in which microlenses are periodically arrayed, and
each of the lens units is disposed corresponding to the respective light source.

2. The illumination apparatus according to claim 1, wherein the multiple light sources each correspond to the multiple lens units one-on-one.

3. The illumination apparatus according to claim 1, wherein the first total-refection lens, the second total-reflection lens and the transmission lens have a square shape when the illumination apparatus is viewed from the front.

4. The illumination apparatus according to claim 1, wherein two of the first total-reflection lenses and two of the second total-reflection lenses surround four directions of the transmission lens, and the first total-reflection lens, the second total-reflection lens, and the transmission lens have a square shape, when the illumination apparatus is viewed from the front.

5. The illumination apparatus according to claim 1, wherein, compared to the horizontal direction of the illumination apparatus, divergence of the light to the horizontal direction is broader.

6. The illumination apparatus according to claim 1, wherein the cross-section of the microlens is formed by four arcs, and two adjacent arcs among the four arcs are continuous such that slopes of their tangent lines are consistent.

7. The illumination apparatus according to claim 1, wherein the cross-sectional shape of the microlens is a shape that is formed by joining arcs with a line.

8. An automobile comprising the illumination apparatus according to claim 1, wherein the multiple lens units in the illumination apparatus do not have any spaces therebetween when the automobile is viewed from the front.

9. The illumination apparatus according to claim 1, wherein the first total reflection lens protrudes toward a light source side from the transmission lens, the second total reflection lens protrudes toward the light source side from the transmission lens.

10. The illumination apparatus according to claim 1, wherein a part of the light from the respective light source directly enters the first total reflection lens, a part of the light of the respective light source directly enters the second total reflection lens, a part of the light from the respective light source directly enters the transmission lens.

11. The illumination apparatus according to claim 1, wherein a width of the transmission lens is larger than a width of the first total-reflection lens and a width of the second total-reflection lens, when the illumination apparatus is viewed from the front.

* * * * *